April 1, 1969     H. F. LANGE ET AL     3,436,114
FILAMENT WOUND PRODUCT AND METHOD FOR MAKING THE SAME
Filed Sept. 25, 1967
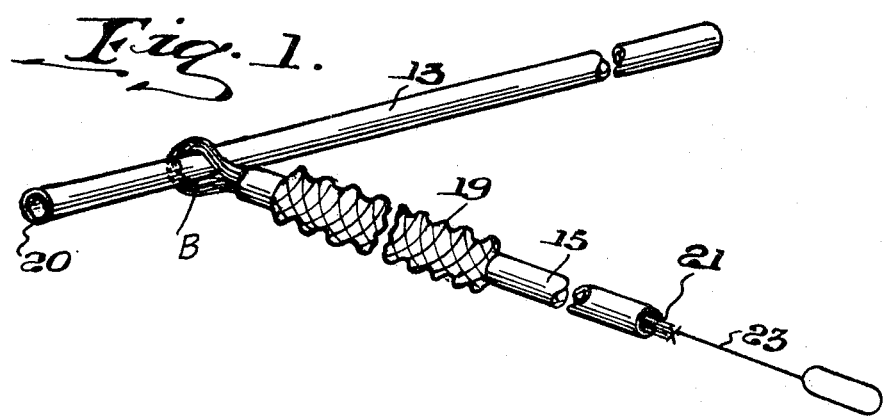
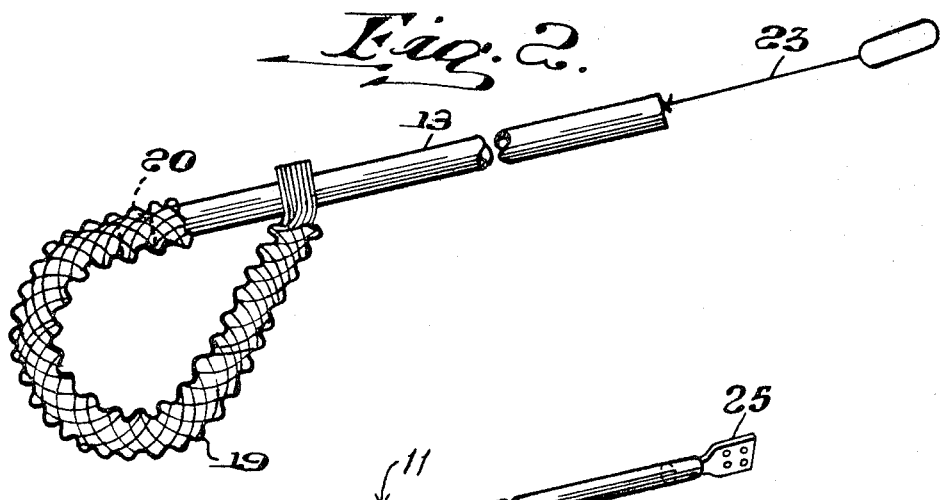
INVENTORS.
HENRY F. LANGE,
HAROLD E. PHIPPS.
BY
their ATTORNEY.

United States Patent Office 3,436,114
Patented Apr. 1, 1969

3,436,114
FILAMENT WOUND PRODUCT AND METHOD FOR MAKING THE SAME
Henry F. Lange and Harold E. Phipps, Bristol, Tenn., assignors to Universal Moulded Fiber Glass Corp., a corporation of Delaware
Filed Sept. 25, 1967, Ser. No. 670,362
Int. Cl. B66c 1/12; D04h 3/12
U.S. Cl. 294—74                                4 Claims

ABSTRACT OF THE DISCLOSURE

An article of manufacture and the method for obtaining the same includes an eye formed on one end and a connector type fitting on the other end of a rigid filament wound reinforced plastic tube.

Background of the invention

In some logistic operations, it is necessary and desirable to transfer cargo from ships at sea to helicopters hovering overhead. The ship may be moving forward under its own power or stopped, and is moving under the influence of the wind and waves. The helicopter also must move along with the ship and the helicopter may also be subjected to motion of the wind. The transfer of cargo from the ship to the helicopter is accomplished by lowering a wire rope from the helicopter under the control of a winch and a metal cargo hook is connected to a cargo net or slings of the usual type. However, with both the helicopter and the vessel moving in an unpredictable manner, the cargo hook sometimes was improperly attached to the cargo net, the hook caught on hatch coamings and other deck equipment, and the crew, standing on a steel deck, frequently received a static electric shock when they touched the cargo hook.

In contrast to the foregoing, the present invention provides a solution to the problem that eliminates the danger of improper attachment of the cargo sling or net to the wire rope, the danger of the cargo hook catching on the deck or other structure, and the elimination of the static electric discharge into a crew member.

Summary of the invention

An article of manufacture and the method for making the same comprises looping resin impregnated filaments around a first plastic tube; inserting the filaments into and through a second plastic tube; covering the second tube with a filamentary mesh; inserting the free ends of the filaments into one end of the first tube; curing the resin of the filaments; arranging the mesh over the first tubing where the ends of the second tube abuts the first tube; resin impregnating the mesh; and curing the resin of the mesh. Thereafter, a connector type fitting is attached to the free end of the first tubing.

For a further understanding of the invention and for advantages and features thereof, reference may be made to the following description in conjunction with the accompanying drawing which shows for the purpose of exemplification a preferred embodiment of the invention.

Brief description of the drawing

In the drawing:
FIG. 1 is a schematic view of components as arranged initially for practicing the method of the invention and making the product of the invention;
FIG. 2 is a schematic view of the components as arranged at an intermediate stage of the method; and
FIG. 3 is a schematic view of the finished product of the invention.

Detailed description

FIG. 1 shows the components used to make the article of manufacture, a lifting tool 11, in accordance with the method of the invention, arranged in position to commence the method steps. The components comprise a length of hollow tubing 13, preferably a length of rigid fiber glass reinforced resin tubing, such as the fiber glass reinforced resin tubing marketed by Universal Moulded Fiber Glass Corp., Bristol, Virginia under the trademark "eXtren." The tubing 13 may be of any desirable length and size diameter.

A resilient plastic tubing 15, such as polyethylene, of suitable size is cut to a desired length, which, as indicated in FIG. 3 is nearly equal to the perimetrical length of a loop 17 formed on one end of the tool 11 in accordance with the method of the invention. The resilient plastic tube 15 should be approximately the same diameter as the rigid tubing 13. In some applications, flexible metal hose or the like may be used instead of the polyethylene plastic tubing, if preferred. The length of resilient plastic tubing 15 is then covered with tubular fiber glass mesh 19 having a length somewhat longer than the length of the plastic tubing 15; the additional length of mesh may be in the order of 3 or 4 inches. The mesh 19 may be obtained commercially and should be of such size that it maintains a close fit on the polyethylene tubing when it is stretched out in the manner described hereinafter. Initially, however, the fiber glass mesh is bunched up and is loosely arranged on the polyethylene tubing, and the fiber glass mesh 19 at this stage of the method is dry and is not resin impregnated.

Thereafter, a plurality of high-count, multiple-end fiber glass rovings 21 are looped around the resin tubing 13, as shown in FIG. 1, at a selected location, for example at B of FIG. 3, near end 20 of the tubing 13. The rovings 21, which have been previously wet-out with a suitable heat hardenable resin, such as a polyester resin, are pulled through the resilient plastic tubing 15; the free ends of the rovings projecting out of the tubing 15 some 3 to 6 inches.

Next, in order to be able to pull the outward projecting ends of the rovings 21 up into the "eXtren" tubing 13, a pulling wire 23, or the equivalent thereof, is secured to the ends of the rovings 21, and the pulling wire 23 is fed through the tube 13. The end of the wire 23 projects beyond the tube 13 so as to be available to pull the rovings 21 through open end 20 of tube 13 and part way up into the tube 13 for a distance of about 3 to 6 inches. The resilient plastic tube 15 is then bent to the shape of the loop 17 (FIG. 2); with the one end of tube 15 abutting against the side of the tube 13 at the point B where the rovings 21 loop around the tube 13, and with the other end of tube 15 abutting the open end 20 of the tube 13 that is near point B, in a substantially coaxial alignment.

Thereafter, the composite structure, shaped in the manner just described and comprising the stiff tubing 13, the flexible bent tubing 15 with the resin wet rovings 21 inside it, and the outer mesh covering 19, is placed in a forming device (not shown) to shape the hoop or loop 17 at the end of the product 11 to the desired shape. The resin in the rovings 21 is then cured by heating the composite loop structure in an oven to a temperature in the range of 150°–175° F. Thereafter, the product structure is removed from the oven and from the forming device.

The fiber glass mesh is then stretched out and one end is formed over the end 20 of the stiff tube 13, while the other end of the mesh 19 is fashioned over the tube 13 to cover the rovings 21 that are looped around the tube 13 at B. Resin, such as an epoxy resin, is then applied by a brush or in any other suitable manner to the mesh 19 and this resin is cured by placing the structure in the oven or by allowing the resin to cure in the air.

In the logistics application it is desirable to maintain a certain amount of the surface roughness or texture of the mesh, and so the amount of resin applied to the mesh does not produce a resin rich surface over the mesh, but produces a surface that is slightly rough to the touch of one's hand. For other applications, the smooth surface of a resin rich surface may be desirable, and this is readily achieved by applying more resin to the mesh than in the logistics applications.

The free end of the "eXtren" tubing 13 is then resin bonded, or otherwise suitably fastened, to another member, which is a connector-type fitting of resin or other suitable material. The fitting is a connection between the wire rope and the lifting tool and should also be adapted to be connected to an end of the wire rope.

A feature of the invention is that the product is simple to produce, is lightweight, has high strength and durability, and is suitable for use in lifting cargo from ships at sea or any service product having such characteristics.

A feature of the invention is that the loop will not catch on deck structure as readily as an open cargo hook, thereby preventing damage to ship structure and damage to the helicopter winch.

A feature of the invention is that the lifting eye has excellent dielectric properties and the crew handling the cargo are not subjected to static electric shock.

Although the invention has been described herein with a certain degree of particularity, it is understood that the disclosure has been made only as an example.

What is claimed is:
1. The method for making an article of manufacture comprising the steps:
 (a) cutting of said first tube is cutting a rigid plastic length;
 (b) cutting second plastic tubing to a desired preselected length;
 (c) looping a plurality of thermosetting resin impregnated filaments around said first plastic tubing;
 (d) surrounding said second tubing with a mesh sleeve having a length greater than the length of said second tubing;
 (e) passing the free ends of said resin impregnated filaments into one end of and through said second tubing, said free ends projecting from the other end of said second tubing;
 (f) abutting the one end of said second tubing against the side of said first tubing and maintaining the same in position while
 (g) bending said second tubing so that the other end thereof abuts against one end of said first tubing;
 (h) inserting the free ends of said filaments into the one end of said first tubing;
 (i) shaping the composite structure to a desired loop configuration;
 (j) curing the resin of said filaments;
 (k) arranging said mesh on said second tubing so that the free ends thereof extend onto said first tubing;
 (l) coating said mesh with thermosetting resin; and
 (m) curing the resin of said mesh.
2. The method of claim 1 including:
attaching a fitting to the other end of said first tubing.
3. The method of claim 1 wherein:
 (a) cutting of said first tube in cutting a rigid plastic tube; and
 (b) cutting of said second tube is cutting a flexible tube.
4. A lifting tool comprising:
an elongate rigid thermosetting resin tube terminating at one end in a loop that is a laminate structure having a core of thermosetting resin reinforced with a plurality of rovings surrounding said rigid tube at a location near one end and extending arcuately therefrom and into said one end of said rigid tube, said core being bonded to said rigid tube at the zones of contact with said rigid tube, said core being surrounded by a flexible tube, and a thermosetting resin tube reinforced with woven fiber glass mesh surrounding said flexible tube.

References Cited

UNITED STATES PATENTS 2,558,855   7/1951   Knewstubb et al. ___ 57—162 X
2,602,766   7/1952   Francis _____ 156—180 X RICHARD E. AEGERTER, *Primary Examiner.*

ROBERT D. GUIOD, *Assistant Examiner.*

U.S. Cl. X.R.

156—166, 180

U.S. DEPARTMENT OF COMMERCE
PATENT OFFICE
Washington, D.C. 20231

UNITED STATES PATENT OFFICE
CERTIFICATE OF CORRECTION

Patent No. 3,436,114

April 1, 1969

Henry F. Lange et al.

It is certified that error appears in the above identified patent and that said Letters Patent are hereby corrected as shown below:

Column 3, lines 37 and 38, cancel "cutting of said first tube is cutting a rigid plastic length;" and insert -- cutting first plastic tubing to a desired preselected length; --. Column 4, line 20, "in" should read -- is --

Signed and sealed this 14th day of April 1970.

(SEAL)
Attest:

Edward M. Fletcher, Jr.
Attesting Officer

WILLIAM E. SCHUYLER, JR.
Commissioner of Patents